(12) United States Patent
He et al.

(10) Patent No.: US 12,282,835 B1
(45) Date of Patent: Apr. 22, 2025

(54) METHODS AND DEVICES FOR CONSTUCTING MULTI-DIMENSIONAL COUPLED VIBRATION IDENTIFICATION MODEL FOR ROLL SYSTEM OF STRIP MILL

(71) Applicant: TAIYUAN UNIVERSITY OF TECHNOLOGY, Shanxi (CN)

(72) Inventors: Dongping He, Taiyuan (CN); Ziheng Duan, Taiyuan (CN); Tao Wang, Taiyuan (CN); Huidong Xu, Taiyuan (CN); Yuanming Liu, Taiyuan (CN); Qingxue Huang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/979,585

(22) Filed: Dec. 12, 2024

(30) Foreign Application Priority Data

May 17, 2024 (CN) .......................... 202410616011.6

(51) Int. Cl.
*G06N 20/10* (2019.01)
*B21B 38/00* (2006.01)

(52) U.S. Cl.
CPC ........... *G06N 20/10* (2019.01); *B21B 38/008* (2013.01)

(58) Field of Classification Search
None
See application file for complete search history.

(56) References Cited

U.S. PATENT DOCUMENTS

2022/0196042 A1  6/2022 Froemming et al.
2024/0033797 A1* 2/2024 Fujita ................... B21B 37/007

FOREIGN PATENT DOCUMENTS

CN  104190724 A  12/2014
CN  105903769 A   8/2016
(Continued)

OTHER PUBLICATIONS

Ling, Qihui et al., Coupling Vibration Feature Extraction of Hot Continuous Rolling Mill Based on Adaptive Frequency Domain Filtering and S transform, Journal of Vibration, Measurement & Diagnosis, 36(1): 201-202&115-119, 2016.

(Continued)

*Primary Examiner* — Xuyang Xia
(74) *Attorney, Agent, or Firm* — PORUS IP LLC

(57) ABSTRACT

Embodiments of the present disclosure provides a method and device for constructing a multi-dimensional coupled vibration identification model for a roll system of a strip mill, the method comprising: performing preprocessing, signal decomposition, and reconstruction of the multi-dimensional data for the roll system of the strip mill monitored through technical monitoring by multiple sensors during a working process of the strip mill, and performing feature extraction of the reconstructed data using a wavelet packet energy approach; obtaining an initial multi-dimensional coupled vibration feature local identification model for the roll system of the strip mill based on Support Vector Machine (SVM) by using a Gaussian radial basis function as a kernel function of the SVM model; and training the initial multi-dimensional coupled vibration feature local identification model for the roll system of the strip mill using a multi-source heterogeneous information fusion approach based on the feature vector to obtain the multi-dimensional coupled feature identification model for the roll system of the strip mill.

7 Claims, 5 Drawing Sheets

(56) References Cited

FOREIGN PATENT DOCUMENTS

| | | | |
|---|---|---|---|
| CN | 111723442 A | | 9/2020 |
| CN | 111922095 A | | 11/2020 |
| CN | 113657156 A | | 11/2021 |
| CN | 113835411 A | | 12/2021 |
| CN | 114522988 A | | 5/2022 |
| CN | 116689514 A | * | 9/2023 |
| CN | 117609885 A | | 2/2024 |
| JP | 2011115825 A | | 6/2011 |
| WO | WO-2022049975 A1 | * | 3/2022 |

OTHER PUBLICATIONS

Shi, Peiming et al., Rolling mill chatter warning method based on sparse auto-encoder and self-organizing map network, Forging & Stamping Technology, 48(1): 171-178, 2023.

Zhang, Guohua et al., Fluid-Solid Coupling Heat Transfer Model for Fluid Heating Transfer Roll of Magnesium Alloy Sheet, Rare Metal Materials and Engineering, 47(8): 2489-2499, 2018.

Zheng, Jinde et al., A rolling bearing fault diagnosis method based on multi-scale fuzzy entropy and variable predictive model-based class discrimination, Mechanism and Machine Theory, 78: 187-200, 2014.

First Office Action in Chinese Application No. 202410616011.6 mailed on Jun. 17, 2024, 14 pages.

Decision to Grant a Patent in Chinese Application No. 202410616011.6 mailed on Jun. 28, 2024, 5 pages.

* cited by examiner

METHODS AND DEVICES FOR CONSTUCTING MULTI-DIMENSIONAL COUPLED VIBRATION IDENTIFICATION MODEL FOR ROLL SYSTEM OF STRIP MILL

CROSS-REFERENCE TO RELATED APPLICATIONS

The present disclosure claims priority to Chinese Application No. 202410616011.6, filed on May 17, 2024, the contents of which are hereby incorporated by reference.

TECHNICAL FIELD

The present disclosure relates to a technical field of vibration of a strip mill, and in particular, relates to a method and device for constructing a multi-dimensional coupled vibration identification model for a roll system of a strip mill.

BACKGROUND

A strip mill is a large-scale complex electromechanical-hydraulic integration equipment with characteristics of multi-variability, strong coupling, nonlinear, time-varying, multi-constraints, or the like. With a rapid development of the rolling mill toward the large-scale, high-speed, continuous, and intelligent, as well as a large number of new technologies and new processes, the study of plate and strip mill roll system vibration has gradually changed from a single vibration attribute to the study of multi-dimensional coupled vibration. A multi-dimensional coupled vibration type of the strip mill includes machine-liquid coupling, machine-electrical coupling, electrical-liquid coupling, machine-electrical-liquid coupling, vertical-torsional coupling, vertical-horizontal coupling, torsional-horizontal coupling, and vertical-horizontal-torsional coupling.

The roll system of the strip mill, as a core system to ensure the accuracy of the plate thickness, the reliability of its work is to ensure high precision, high speed, continuous, and stable rolling key. However, a large number of production practices show that the roll system of the strip mill in the production process often occurs multi-dimensional coupling vibration phenomenon, which directly affects the stability of the rolling process and the quality of rolled parts. In the production process, conditions such as bearing damage, roll surface peeling, roll surface wear and tear, and the work of the roll fracture may be occurred, and serious cases may even cause damage to equipment, threatening the safety of the operator's life and enterprise economic benefits, while also impeding the development process of rolling production of high-precision and intelligent development process. The study of multi-dimensional coupled vibration for the roll system of the strip mill often adopts the traditional response to the vibration characteristics based on a single physical quantity, such as force, displacement, or acceleration, or the like. The strip mill rolling process is a high-speed, heavy-duty, and multi-scale coupled complex nonlinear dynamic production process. The strip rolling process is a high-speed, heavy load and multi-scale coupling of complex nonlinear dynamic production process, electromechanical liquid signals of equipment contain a wealth of information on the characteristics of the equipment operation; the work process using only one sensor can only capture a small portion of the equipment vibration signals, and cannot accurately make effective judgments and predictions on the working state of the strip mill.

There is therefore an urgent need to provide a more reliable method for constructing the multi-dimensional coupled vibration identification model for the roll system of the strip mill.

SUMMARY

The present disclosure is to provide a method and device for constructing a multi-dimensional coupled vibration identification model for a roll system of a strip mill to solve the problem of the prior art of not being able to accurately and efficiently judge and predict the working state of the strip mill.

In order to achieve the above purposes, the disclosure provide the following technical solution:

In a first aspect, the present disclosure provides a method, comprising:
  obtaining multi-dimensional data for the roll system of the strip mill during operation; wherein the multi-dimensional data is monitored through technical monitoring by multiple sensors; the multi-dimensional data includes a three-axis acceleration signal of a bearing seat, a torque signal of a drive shaft, a rolling force signal, a current signal of a servo valve, and a pressure signal of large-small cavities of a press-down cylinder; obtaining preprocessed data by preprocessing the multi-dimensional data; obtaining reconstructed data by decomposing and reconstructing the preprocessed data; obtaining a feature vector by extracting a feature from the reconstructed data using a wavelet packet energy manner; obtaining, based on using a Gaussian radial basis function as a kernel function of Support Vector Machine (SVM) model, an initial multi-dimensional coupled vibration feature local identification model for the roll system of the strip mill based on SVM; training, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill.

In a second aspect, the present disclosure provides a device, comprising:
  a multi-dimensional data obtain module configured to obtaining multi-dimensional data for the roll system of the strip mill during operation; wherein the multi-dimensional data is monitored through technical monitoring by multiple sensors; the multi-dimensional data includes a three-axis acceleration signal of a bearing seat, a torque signal of a drive shaft, a rolling force signal, a current signal of a servo valve, and a pressure signal of large-small cavities of a press-down cylinder; a data preprocessing module configured to obtaining preprocessed data by preprocessing the multi-dimensional data; a signal decomposition and reconstruction module configured to obtaining reconstructed data by decomposing and reconstructing the preprocessed data; a feature extraction module configured to obtaining a feature vector by extracting a feature from the reconstructed data using a wavelet packet energy manner; an initial recognition model building module configured to obtaining, based on using a Gaussian radial basis function as a kernel function of Support Vector Machine (SVM) model, an initial multi-dimensional coupled vibration feature local identification model for the roll system of the strip mill based on SVM; a multi-dimensional coupled feature identification model for the roll system of the strip mill construction module configured to training, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill; compared with the existing technology, the method provided in the present disclosure adopts the multiple sensors technology to monitor and capture the multi-dimensional data of the operation for the roll system of the strip mill in real time, which contains richer vibration information and can accurately respond to the nature of the vibration of the strip mill, and realizes efficient and accurate identification of the multi-dimensional coupled vibration characteristics of the strip mill; obtaining, based on using a Gaussian radial basis function as a kernel function of Support Vector Machine (SVM) model, an initial multi-dimensional coupled vibration feature local identification model for the roll system of the strip mill based on SVM, and using a multi-source heterogeneous information fusion manner, obtaining a multi-dimensional coupled vibration feature identification model for the roll system of the strip mill based on SVM-DS, so as to ensure that the strip mill operates stably in the optimal working condition.

BRIEF DESCRIPTION OF THE DRAWINGS

The accompanying drawings illustrated herein are used to provide a further understanding of the present disclosure, form a part of the present disclosure, and the schematic embodiments of the present disclosure and their illustrations are used to explain the present disclosure and do not constitute an undue limitation of the present disclosure. In the accompanying drawings.

DETAILED DESCRIPTION

In order to facilitate a clear description of the technical solutions of the embodiments of the present disclosure, in the embodiments of the present disclosure, words such as "first" and "second" are used to distinguish between identical or similar items having substantially the same functions and actions. "First," "second," or the like are used in the embodiments of the present disclosure to differentiate between identical or similar items having essentially the same function and role. For example, the first threshold and the second threshold are merely for distinguishing between different thresholds, and do not qualify their order of precedence. The person skilled in the art may understand that the words "first," "second," etc., do not have any effect on the number and execution of the first threshold. The words "first," "second," etc. do not qualify the number and order of execution, and the words "first," "second," etc. do not qualify that they are necessarily different.

It should be noted that the words "exemplary" or "for example" are used in the present disclosure to denote the use of an example or illustration. Any embodiments or design solutions described as "exemplary" or "for example" in the present disclosure should not be construed as preferred or advantageous over other embodiments or design solutions. Rather, the use of the words "exemplary" or "for example" is intended to present relevant concepts in a specific manner.

Figure 1:
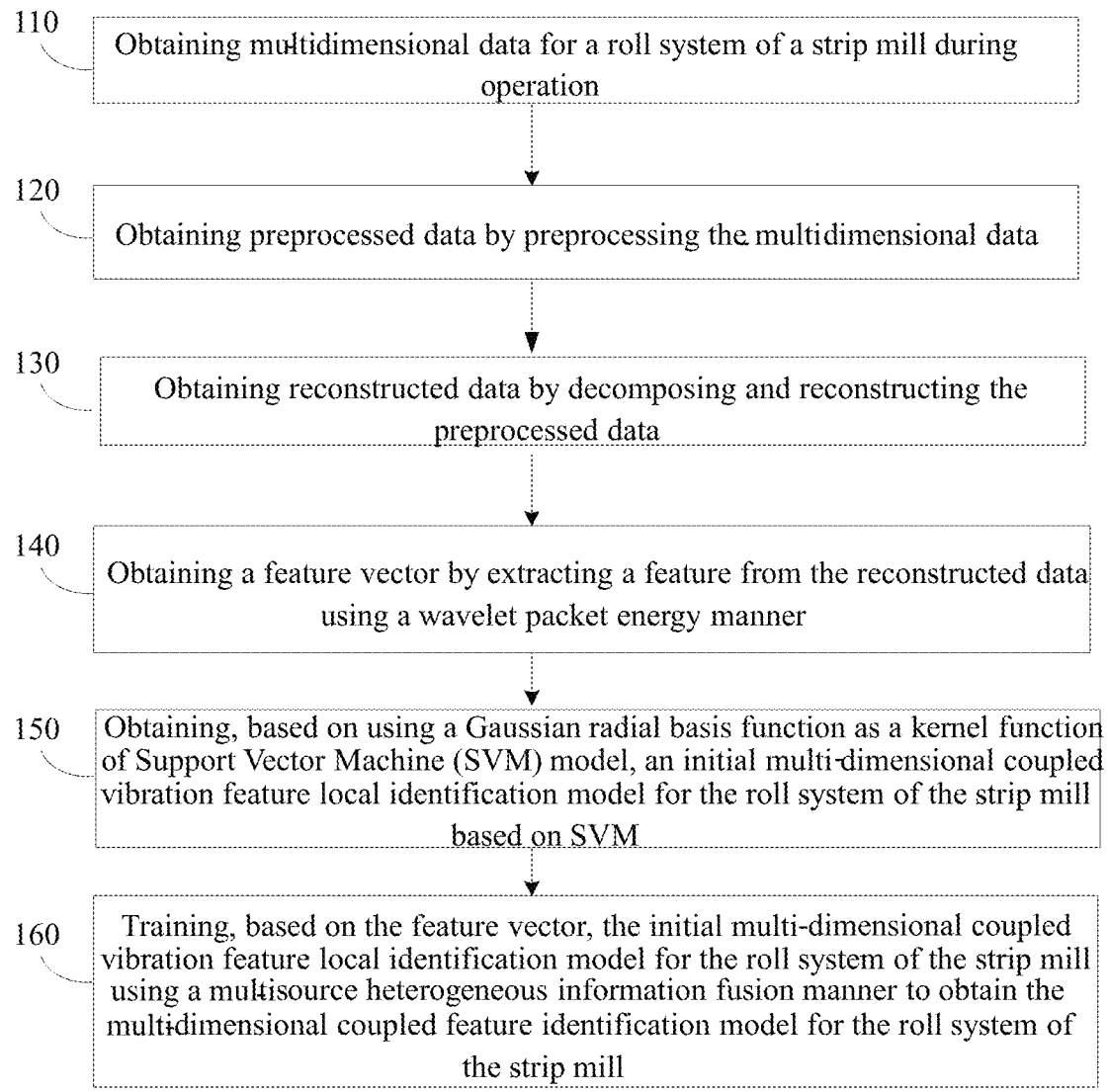
FIG. 1 is a flowchart illustrating a method for constructing a multi-dimensional coupled vibration identification model for a roll system of a strip mill according to the present disclosure.

Next, the program provided by embodiments of the present disclosure is described in connection with the accompanying drawings:

As shown in FIG. 1, a process of a method for constructing a multi-dimensional coupled vibration identification model for a roll system of a strip mill may include the following operations:

In 110, obtaining multi-dimensional data for the roll system of the strip mill during operation; wherein the multi-dimensional data is monitored through technical monitoring by multiple sensors.

In some embodiments, the multi-dimensional data includes a three-axis acceleration signal of a bearing seat, a torque signal of a drive shaft, a rolling force signal, a current signal of a servo valve, and a pressure signal of large-small cavities of a press-down cylinder.

In some embodiments, the three-axis acceleration signal of the bearing seat includes an acceleration signal $a_1$ of an upper work roller bearing seat operation side, an acceleration signal $a_2$ of an upper work roller bearing seat drive side, an acceleration signal $a_3$ of a lower work roller bearing seat operation side, and an acceleration signal $a_4$ of a lower work roller bearing seat drive side.

In some embodiments, the torque signal of the drive shaft includes an upper work roll torque signal $\omega_1$ and a lower work roll torque signal $\omega_2$.

In some embodiments, the rolling force signal includes an operation side rolling force signal $F_1$ and a drive side rolling force signal $F_2$.

In some embodiments, the current signal of the servo valve includes an operation-side servo valve current signal $I_1$ and a drive-side servo valve current signal $I_2$.

In some embodiments, the pressure signal of large-small cavities of the press-down cylinder includes a pressure signal $Y_1$ of an operation side oil cylinder large cavity, a pressure signal $Y_2$ of an operation side oil cylinder small cavity, a pressure signal $Y_3$ of a drive side oil cylinder large cavity, and a pressure signal $Y_4$ of a drive side oil cylinder small cavity.

The multiple sensors need to be installed ahead of time. Therefore, in some embodiments, before operation 110, the method further includes:

determining an installation type and position of required sensor based on a multi-dimensional coupled feature for the roll system of the strip mill.

In some embodiments, the required sensor may include: a three-axis acceleration sensor, a torque sensor, a force sensor, a pressure sensor, and a current sensor; the three-axis acceleration sensor may be configured for online real-time detection of the three-axis acceleration characteristics of the bearing seat; the torque sensor is configured for online real-time detection of torque of the transmission shaft; the force sensor is configured for online real-time detection of a size of the rolling force; the pressure sensor is configured for online real-time detection of the working pressure of the large-small cavities of a press-down cylinder; the current sensor is configured for online real-time detection of the current signal of the servo valve. After the multiple sensors are installed, multiple sensor technology is configured to monitor and capture the multi-dimensional data for the roll system of the strip mill in real time during a working process.

In 120, obtaining preprocessed data by preprocessing the multi-dimensional data.

In some embodiments, the preprocessing may include at least one of denoising, culling of a singular value signal, and interpolating missing values.

In 130, obtaining reconstructed data by decomposing and reconstructing the preprocessed data.

In some embodiments, decomposing and reconstructing is used to reconstruct the preprocessed data into data that satisfies conditions for subsequent feature extraction.

In 140, obtaining a feature vector by extracting a feature from the reconstructed data using a wavelet packet energy manner.

In 150, obtaining, based on using a Gaussian radial basis function as a kernel function of Support Vector Machine (SVM) model, an initial multi-dimensional coupled vibration feature local identification model for the roll system of the strip mill based on SVM;

In some embodiments, when constructing the initial identification model, the Gaussian radial basis function may be used as a kernel function of Support Vector Machine (SVM) model.

In 160, training, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill.

In some embodiments, the multi-dimensional coupled vibration feature identification model for the roll system of the strip mill based on SVM-DS is constructed using the multi-source heterogeneous information fusion manner, and through the fusion of rolling force, acceleration, pressure, and servo valve current signals of the strip mill, the operating characteristics of the strip mill in the rolling production process can be simply and effectively identified, which enables effective judgment and prediction of the strip mill's operating state, so as to ensure that the strip mill is stable and operates in the best working conditions.

According to the method described in FIG. 1, the method discloses obtaining multi-dimensional data for the roll system of the strip mill obtained by monitoring the roll system using multiple sensors technique during operation; preprocessing the multi-dimensional data to obtain the preprocessed data; performing signal decomposition and reconstruction of the preprocessed data to obtain the reconstructed data; using the wavelet packet energy manner to perform feature extraction on the reconstructed data to obtain the feature vector; and based on using the Gaussian radial basis function as kernel function of the SVM model, obtaining the initial multi-dimensional coupled vibration feature local identification model for the roll system of the strip mill based on SVM; based on the feature vector, using the multi-source heterogeneous information fusion manner to train the initial multi-dimensional coupled vibration feature local identification model for the roll system of the strip mill, and obtaining the multi-dimensional coupled feature identification model for the roll system of the strip mill.

In some embodiments, since the feature vectors may be obtained by using the wavelet packet energy manner for feature extraction of the reconstructed data, in other words, the method in FIG. 1 may using the multi-source heterogeneous information fusion manner to train the initial multi-dimensional coupled vibration feature local identification model for the roll system of the strip mill by multi-dimensional coupled feature identification model for the roll system of the strip mill to obtain the multi-dimensional coupled feature identification model for the roll system of the strip mill.

The method provided in the present disclosure adopts multiple sensors technology to monitor and capture the multi-dimensional data for operations of the roll system of the strip mill in real time, which contains rich vibration information and can accurately reflect the nature of the vibration of the strip mill, achieving efficient and accurate identification of the multi-dimensional coupled vibration features for the roll system of the strip mill; based on using the Gaussian radial basis function as the kernel function of the Support Vector Machine (SVM) model, the initial multi-dimensional coupled vibration feature local identification model for the roll system of the strip mill is obtained, and the initial multi-dimensional coupled vibration feature local identification model for the roll system of the strip mill based on SVM-DS (Dempster Shafer, DS) is constructed using the multi-source heterogeneous information fusion manner, thereby ensuring that the strip mill operates steadily under optimal conditions.

Based on the method of FIG. 1, embodiments of the present disclosure also provide embodiments of the method, which are described below.

Figure 2:
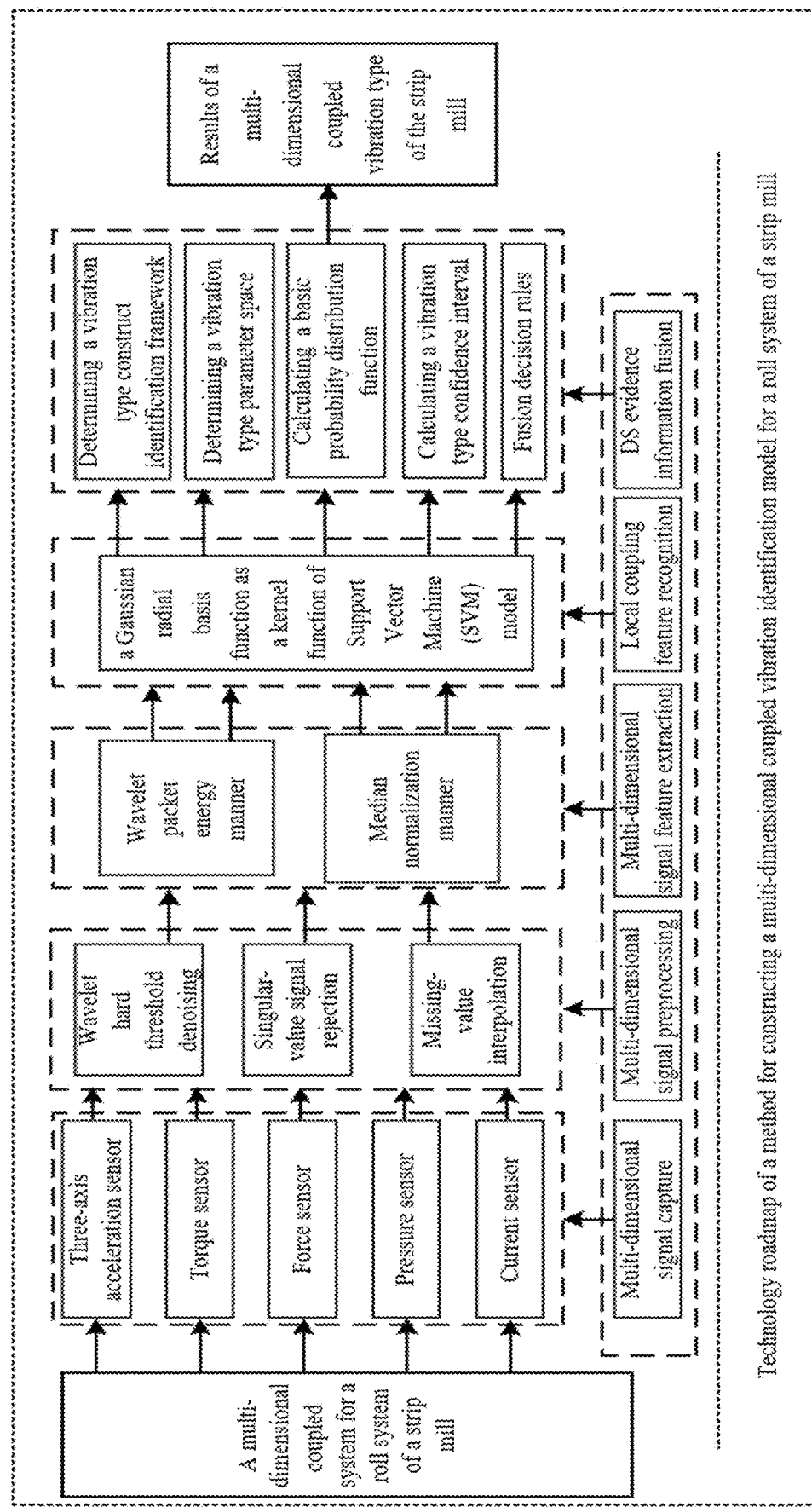
FIG. 2 is a schematic diagram illustrating a technology roadmap of a method for constructing a multi-dimensional coupled vibration identification model for a roll system of a strip mill according to the present disclosure.

The method of constructing a multi-dimensional coupled vibration identification model for the roll system of the strip mill is shown in FIG. 2. As shown in FIG. 2, the constructing of the multi-dimensional coupled vibration identification model for the roll system of the strip mill may include multi-dimensional signal capture, multi-dimensional signal preprocessing, multi-dimensional signal feature extraction, local coupling feature recognition, and DS evidence information fusion.

In some embodiments, the multi-dimensional signal capture may be multi-dimensional signal of the roller system from the strip mill by using multi-sensor technologies such as three-axis acceleration sensor, torque sensor, force sensor, pressure sensor, current sensor, or the like for real-time monitoring and capture the multi-dimensional data during a working process.

In some embodiments, the multi-dimensional signal preprocessing may include wavelet hard-domain value denoising, singular-value signal rejection, and missing-value interpolation.

In some embodiments, the multi-dimensional signal feature extraction may include signal decomposition and reconstruction of the preprocessed data using a wavelet packet decomposition algorithm and feature extraction of the reconstructed data using the wavelet packet energy manner.

In some embodiments, the local coupling feature recognition may include using Gaussian radial basis function as the kernel function of the SVM model to obtain the multi-dimensional coupled feature identification model for the roll system of the strip mill based on SVM.

In some embodiments, the DS evidence information fusion may include: determining a vibration type construct identification framework, determining a vibration type parameter space, calculating a basic probability distribution function, calculating a vibration type confidence interval, and fusing decision rules.

In some embodiments, based on the above multi-dimensional signal capture, multi-dimensional signal preprocessing, multi-dimensional signal feature extraction, local coupling feature identification, and fusion of DS evidence information, a result of the multi-dimensional coupled vibration type of the strip mill may be determined.

In some embodiments, the operation 120 includes:
denoising the collected the multi-dimensional data for the roll system of the strip mill using a wavelet hard-domain value denoising manner to obtain first basic data;
culling of a singular value signal from the first basic data according to a pauta criterion to obtain second basic data; and
interpolating the second basic data with missing values using an interpolation function manner to obtain the preprocessed data.

In some embodiments, the process of denoising, culling of the singular value, and interpolating missing value may be performed in the following ways:
denoising the collected multi-dimensional data for the roll system of the strip mill of the strip mill, by formula (1):

$$\overline{\omega}_{j,k} = \begin{cases} \omega_{j,k} \omega_{j,k} \geq \lambda \\ 0 \omega_{j,k} < \lambda \end{cases} ; \quad (1)$$

wherein $\overline{\omega}_{j,k}$ is an original wavelet coefficient of a strip mill system, $\overline{\omega}_{j,k}$ is a wavelet coefficients of the strip mill system after hard-domain value processing, $\lambda$ is a multi-dimensional coupling characteristic setting threshold of an under pressure system, j=1, 2, . . . , n denotes a number of layers of wavelet decomposition, and k=1, 2 denotes an order of wavelet decomposition coefficients.

using the pauta criterion, by formula (2):

$$y_i - \overline{y} > 3\sigma_y \quad (2);$$

culling of a singular value signal for the first basic data; wherein $y_i$ denotes the multi-dimensional operational data, y denotes a mean value of the multi-dimensional operational data collected by the system, $$\overline{y} = \frac{\sum_{i=1}^{n} y_i}{n};$$

$\sigma_y$ denotes a mean square deviation of the multi-dimensional operational data collected by the system, $$\sigma_y = \sqrt{\frac{1}{n-1} \sum_{i=1}^{n} (y_i - \overline{y})^2}.$$

using interpolating polynomials, by formula (3):

$$f(y) = f(y_1) + (y - y_1)f[y_2, y_1] + (y - y_1)(y - y_2)f[y_3, y_2, y_1] + \quad (3)$$
$$(y - y_1)(y - y_2)(y - y_3)f[y_4, y_3, y_2, y_1] + \ldots +$$
$$(y - y_1)(y - y_2) \ldots (y - y_{n-1})f[y_n, y_{n-1}, \ldots y_3, y_2, y_1] +$$
$$(y - y_1)(y - y_2) \ldots (y - y_n)f[y_n, y_{n-1}, \ldots y_3, y_2, y_1, y]$$

interpolating missing values to the second basic data to obtain the preprocessed data; wherein f(y) denotes a value to be interpolated, and $y_n$ denotes an n-th set of the multi-dimensional operational data in the second basic data.

In some embodiments, the operation 130 may include:
performing signal decomposition and reconstruction on the preprocessed data using a wavelet packet decomposition algorithm, by formula (4):

$$\begin{cases} q_0^1(t) = y(t) \\ q_n^{2m-1}(t) = \sum_i H(i - 2t) q_{n-1}^m(t) \\ q_n^{2m}(t) = \sum_i G(i - 2t) q_{n-1}^m(t) \\ q_n^m(t) = 2\left[\sum_i H(i - 2t) q_{n+1}^{2m-1}(t) + \sum_i G(i - 2t) q_{n+1}^{2m}(t)\right] \end{cases} \quad (4)$$

wherein y(t) denotes a time signal, t denotes a time, $q_n^m(t)$ denotes an m-th wavelet packet coefficient on an n-th layer decomposition, i denotes an i-th layer of a wavelet packet, G denotes a crossover filter related to a scale function, and H denotes a crossover filter related to a wavelet function.

In some embodiments, in the operation 140, the obtaining a feature vector by extracting a feature from the reconstructed data using a wavelet packet energy manner, includes:
denoting a frequency band distribution energy of the multi-dimensional data collected by the system after reconstruction at an i-th layer and j-th node of a wavelet packet by $M_{ij}$ (j=0, 1, 2, . . . , $2^i$−1), and using a formula (5):

$$M_{ij} = \sum_{k=1}^{n} |d_{j,k}|^2 \quad (5)$$

to extract the multi-dimensional coupled feature for the roll system of the strip mill; wherein $d_{j,k}$ (j=0, 1, 2, . . . , $2^i$−1, k=1, 2, . . . , n) denotes wavelet packet decomposition node coefficients, and $M_{ij}$ denotes the multi-dimensional coupled feature for the roll system of the strip mill.

Using a formula (6):

$$M = \sum_{j=0}^{2^i-1} M_{ij} \quad (6)$$

to determine a sum of energy M in each frequency band after reconstruction of the multi-dimensional signal for the roll system of the strip mill;
wherein a feature vector $\overline{M}$ of the multi-dimensional coupled feature signal energy distribution for the roll system of the strip mill extracted after reconstruction by wavelet packet decomposition is denoted as formula (7):

$$\overline{M} = \left[ \frac{M_{i0}}{M}, \frac{M_{i1}}{M}, \frac{M_{i2}}{M}, \ldots, \frac{M_{i(2^i-2)}}{M}, \frac{M_{i(2^i-1)}}{M} \right] \quad (7)$$

normalizing the feature vector $\overline{M}$ of the multi-dimensional coupled feature signal energy distribution for the roll system of the strip mill by a median normalization manner:

$$Y' = \frac{Y - Y_{mid}}{Y_{max} - Y_{min}} \quad (8)$$

wherein Y denotes a feature vector that needs to be normalized, Y' denotes the normalized feature vector, $Y_{max}$ denotes the maximum value in the feature vector, $Y_{min}$ denotes the minimum value in the feature vector, and $Y_{mid}$ denotes an intermediate value in the feature vector.

The present disclosure includes eight types of coupled vibrations, taking n=8; obtaining a multi-dimensional coupled feature wavelet packet energy proportion feature vector $\overline{M}_n$ after wavelet three-layer decomposition reconstruction:

$$\overline{M}_n = \left[ \frac{M_0}{M}, \frac{M_1}{M}, \frac{M_2}{M}, \frac{M_3}{M}, \frac{M_4}{M}, \frac{M_5}{M}, \frac{M_6}{M}, \frac{M_7}{M} \right] (n = 1, 2, \ldots 8).$$

In some embodiments, in the operation 150, the obtaining, based on using a Gaussian radial basis function as a kernel function of Support Vector Machine (SVM) model, an initial multi-dimensional coupled vibration feature local identification model for the roll system of the strip mill based on SVM, as formula (9):

$$f(y, \alpha) = \text{sgn} \left\{ \sum_{i=1}^{s} \alpha_i \exp\left[ -\frac{|y - y_i|^2}{\sigma^2} \right] - b \right\} \quad (9)$$

wherein σ denotes the Gaussian radial basis kernel function, b denotes a classification threshold, $a_i$ being determined automatically according to the system, S denotes a coupling factor, and $y_i$ denotes an i-th set of multi-dimensional operational data collected by the system.

In some embodiments, as described above, there are a total of 8 types of coupled vibrations, taking n=8, after constructing an initial recognition model, according to a "one to one" multi-classification rule of the SVM; a total of 28 classifiers are constructed according to 8*(8−1)/2=28.

In some embodiments, building 28 classifiers to diagnose the multi-dimensional coupled vibration type of the strip mill, wherein the multi-dimensional coupled vibration type of the strip mill includes machine-liquid coupling ($H_1$), machine-electrical coupling ($H_2$), electrical-liquid coupling ($H_3$), machine-electrical-liquid coupling ($H_4$), vertical-torsional coupling ($H_5$), vertical-horizontal coupling ($H_6$), torsional-horizontal coupling ($H_7$), and vertical-horizontal-torsional coupling ($H_8$). Then, $Q_1$-$Q_n$ denotes the classifiers, wherein n=28, so that the 28 classifiers are denoted by $Q_1$-$Q_{28}$:

$$Q_1 = \begin{cases} 1 & \text{machine − liquid coupling} \\ -1 & \text{machine − electrical coupling} \end{cases};$$

-continued $$Q_2 = \begin{cases} 1 & \text{machine − liquid coupling} \\ -1 & \text{electrical − liquid coupling} \end{cases};$$

$$Q_3 = \begin{cases} 1 & \text{machine − liquid coupling} \\ -1 & \text{machine − electrical − liquid coupling} \end{cases};$$

$$Q_4 = \begin{cases} 1 & \text{machine − liquid coupling} \\ -1 & \text{vertical − torsional coupling} \end{cases};$$

$$Q_5 = \begin{cases} 1 & \text{machine − liquid coupling} \\ -1 & \text{vertical − horizontal coupling} \end{cases};$$

$$Q_6 = \begin{cases} 1 & \text{machine − liquid coupling} \\ -1 & \text{torsional − horizontal coupling} \end{cases};$$

$$Q_7 = \begin{cases} 1 & \text{machine − liquid coupling} \\ -1 & \text{vertical − horizontal − torsional coupling} \end{cases};$$

$$Q_8 = \begin{cases} 1 & \text{machine − electrical coupling} \\ -1 & \text{eletrical − liquid coupling} \end{cases};$$

$$Q_9 = \begin{cases} 1 & \text{machine − electrical coupling} \\ -1 & \text{machine − electrical − liquid coupling} \end{cases};$$

$$Q_{10} = \begin{cases} 1 & \text{machine − electrical coupling} \\ -1 & \text{vertical − torsional coupling} \end{cases};$$

$$Q_{11} = \begin{cases} 1 & \text{machine − electrical coupling} \\ -1 & \text{vertical − horizontal coupling} \end{cases};$$

$$Q_{12} = \begin{cases} 1 & \text{machine − electrical coupling} \\ -1 & \text{torsional − horizontal coupling} \end{cases};$$

$$Q_{13} = \begin{cases} 1 & \text{machine − electrical coupling} \\ -1 & \text{vertical − horizontal − torsional coupling} \end{cases};$$

$$Q_{14} = \begin{cases} 1 & \text{electrical − liquid coupling} \\ -1 & \text{machine − electrical − liquid coupling} \end{cases};$$

$$Q_{15} = \begin{cases} 1 & \text{electrical − liquid coupling} \\ -1 & \text{vertical − torsional coupling} \end{cases};$$

$$Q_{16} = \begin{cases} 1 & \text{electrical − liquid coupling} \\ -1 & \text{vertical − horziontal coupling} \end{cases};$$

$$Q_{17} = \begin{cases} 1 & \text{electrical − liquid coupling} \\ -1 & \text{torisional − horizontal coupling} \end{cases};$$

$$Q_{18} = \begin{cases} 1 & \text{electrical − liquid coupling} \\ -1 & \text{vertical − horizontal − torsinal coupling} \end{cases};$$

$$Q_{19} = \begin{cases} 1 & \text{machine − electrical − liquid coupling} \\ -1 & \text{vertical − horizontal coupling} \end{cases};$$

$$Q_{20} = \begin{cases} 1 & \text{machine − electrical − liquid coupling} \\ -1 & \text{vertical − horizontal coupling} \end{cases};$$

$$Q_{21} = \begin{cases} 1 & \text{machine − elctrical − liquid coupling} \\ -1 & \text{torsional − horizontal coupling} \end{cases};$$

$$Q_{22} = \begin{cases} 1 & \text{machine − electrical − liquid coupling} \\ -1 & \text{vertical − horizontal − torsional coupling} \end{cases};$$

$$Q_{23} = \begin{cases} 1 & \text{vertical − torsional coupling} \\ -1 & \text{vertical − horizontal coupling} \end{cases};$$

$$Q_{24} = \begin{cases} 1 & \text{vertical − torsional coupling} \\ -1 & \text{torsional − horizontal coupling} \end{cases};$$

$$Q_{25} = \begin{cases} 1 & \text{vertical − trosional coupling} \\ -1 & \text{vertical − horizontal − torsional coupling} \end{cases};$$

$$Q_{26} = \begin{cases} 1 & \text{vertical − horizontal coupling} \\ -1 & \text{torisonal − horizontal coupling} \end{cases};$$

$$Q_{27} = \begin{cases} 1 & \text{vertical − horizontal coupling} \\ -1 & \text{vertical − horizontal − torsional coupling} \end{cases};$$

$$Q_{28} = \begin{cases} 1 & \text{torsional − horizontal coupling} \\ -1 & \text{vertical − horizontal − torsional coupling} \end{cases};$$

In some embodiments, before executing the operation 160, N groups of multi-dimensional coupled data for the roll system of the strip mill (such as the feature vectors obtained in operation 140) after denoising, feature extraction, and data normalization may be selected, wherein Z groups of data are used as training sample data, and the N-Z groups of data are used as test sample data. The Z groups of training sample data are utilized to train the multi-dimensional coupled feature identification model for the roll system of the strip mill based on SVM, and then the model is utilized to perform preliminary multi-dimensional coupled vibration feature recognition on the N-Z test samples.

Figure 3:
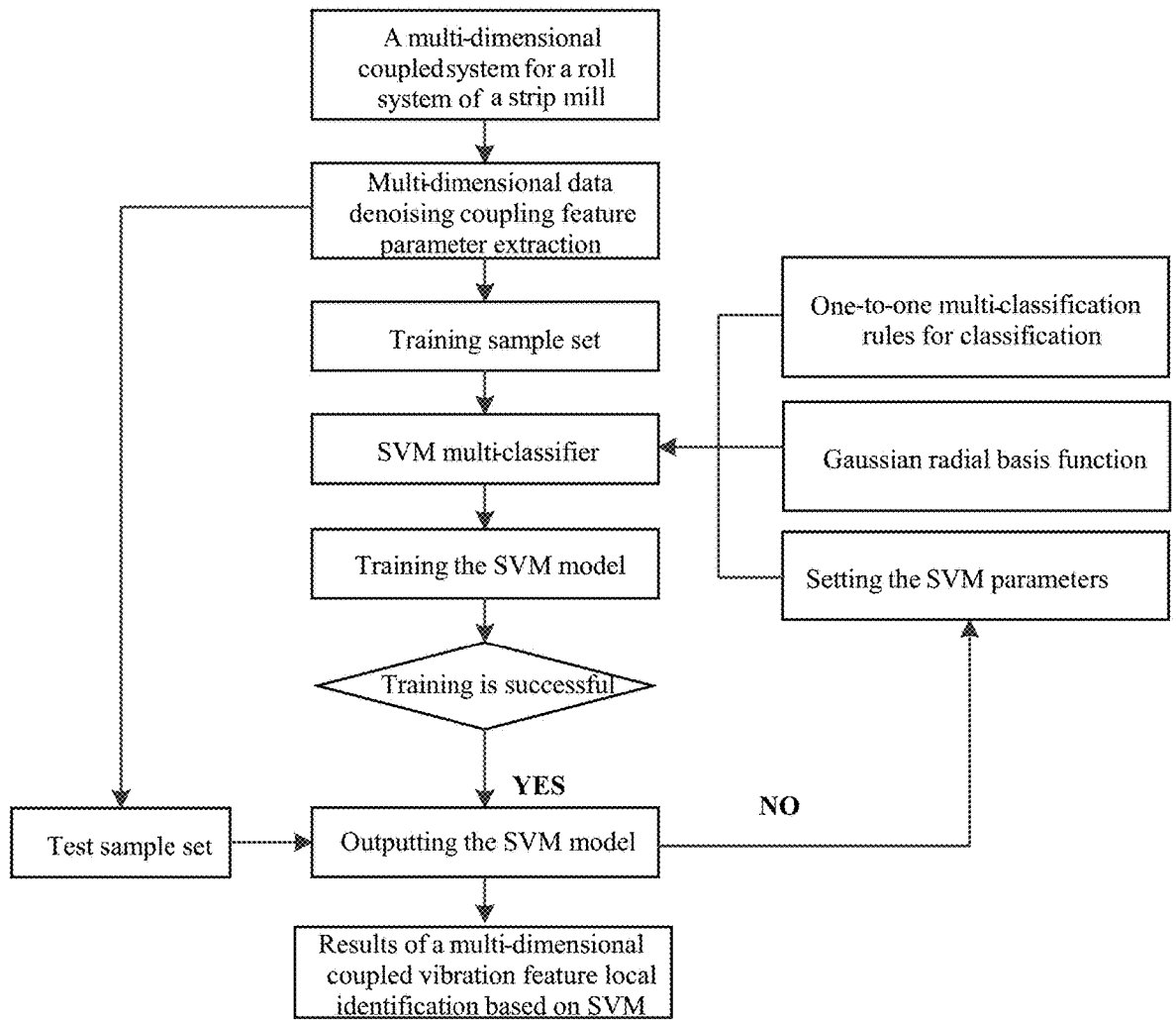
FIG. 3 is a schematic diagram illustrating a technology roadmap for constructing a multi-dimensional coupled feature identification model for a roll system of a strip mill based on SVM according to the present disclosure.

In some embodiments, the flow corresponding to operation 160 can be found in FIG. 3.

As shown in FIG. 3, firstly, multi-dimensional data denoising and coupling feature parameter extraction are carried out based on a multi-dimensional coupling system of strip mill roll system containing multiple sensors; then the training sample set is obtained, and the model is classified by using the SVM multi-classifier to train the SVM model. If the training is successful, the SVM model is output; the extracted multi-dimensional data denoising coupling feature parameters as a test sample set for testing, to obtain a final SVM model, and determine SVM multi-dimensional coupling vibration local feature recognition results obtained by the final model recognition. If the training is unsuccessful, SVM parameters are set, the SVM multi-classifier is re-determined based on the Gaussian radial basis kernel function, and classification is performed based on a "one-to-one multi-classification rule".

In some embodiments, the multi-dimensional coupled feature identification model for the roll system of the strip mill is constructed based on SVM-DS using a multi-source heterogeneous information fusion manner, the process is as follows:

(a) constructing an identification framework for multi-dimensional coupling for the roll system of the strip mill, wherein the identification framework for multi-dimensional coupling for the roll system of the strip mill includes machine-liquid coupling ($H_1$), machine-electrical coupling ($H_2$), electrical-liquid coupling ($H_3$), machine-electrical-liquid coupling ($H_4$), vertical-torsional coupling ($H_5$), vertical-horizontal coupling ($H_6$), torsional-horizontal coupling ($H_7$), and vertical-horizontal-torsional coupling (Hg), the identification framework is denoted as $O=\{H_1, H_2, H_3, H_4, H_5, H_6, H_7, H_8\}$;

(b) determining a multi-dimensional coupled vibration parameter space for the roll system of the strip mill, collecting data for the roll system of the strip mill using multiple types of sensors and extracting feature parameters for categorization, and constructing a multi-dimensional coupled parameter space from a plurality of feature sub-spaces (i.e. the multi-dimensional coupled vibration parameter space for the roll system of the strip mill): $I=\{I_1, I_2, I_3, I_4, I_5\}$;

determining a set of acceleration feature samples: $I_1=\{A_1, A_2, A_3, A_4, A_5, A_6, A_7, A_8\}$; where, $A_1$ denotes an operation side upper bearing seat vertical acceleration; $A_2$ denotes an operation side upper bearing seat horizontal acceleration; $A_3$ denotes an operation side lower bearing seat vertical acceleration; $A_4$ denotes an operation side lower bearing seat horizontal acceleration; $A_5$ denotes a drive side upper bearing seat vertical acceleration; $A_6$ denotes a drive side upper bearing seat horizontal acceleration; $A_7$ denotes a drive side lower bearing seat vertical acceleration; $A_8$ denotes a drive side lower bearing seat horizontal acceleration; and finally, determining the set of acceleration feature samples:

$$I_1 = \{A_1, A_2, A_3, A_4, A_5, A_6, A_7, A_8\} = \overline{M}_1\left[\frac{M_0}{M}, \frac{M_1}{M}, \frac{M_2}{M}, \frac{M_3}{M}, \frac{M_4}{M}, \frac{M_5}{M}, \frac{M_6}{M}, \frac{M_7}{M}\right];$$

a set of current feature samples: $I_2=\{B_1, B_2, B_3, B_4\}$, where $B_1$ denotes an operation side servo valve current; $B_2$ denotes a drive side servo valve current; $B_3$ denotes an operation side proportional valve current; $B_4$ denotes a drive side proportional valve current; a set of acceleration feature samples: $I_3=\{C_1, C_2, C_3, C_4\}$; where, $C_1$ denotes an operation side hydraulic cylinder large chamber operation pressure; $C_2$ denotes an operation side hydraulic cylinder small chamber operation pressure; $C_3$ denotes a drive side hydraulic cylinder large chamber operation pressure; $C_4$ denotes a drive side hydraulic cylinder small chamber operation pressure; a set of rolling force feature samples: $I_4=\{D_1, D_2\}$, where, $D_1$ denotes an operation side rolling force; $D_2$ denotes a drive side rolling force; a set of torque feature samples: $I_5=\{E_1, E_2\}$, where $E_1$ denotes an upper operation roller torque; $E_2$ denotes a lower operation roll torque;

(c) making recognition of each feature subspace $I_j$ (j=1, 2, 3, 4, 5) using the multi-dimensional coupled feature identification model for the roll system of the strip mill based on the SVM and calculating to obtain a multi-dimensional coupled system posterior probability $p_i$, and then performing test training on the above Z sets of training sample data to obtain a classification correctness $q_i=z/n$, the uncertainty of the multi-dimensional coupled vibration for the roll system of the strip mill $m(\theta)=1-z/N$, and the Basic Probability Assignment Function (BPA Function) is $m_j(A)=p_iq_i$; finally, obtaining a basic confidence assignment function set of the multi-dimensional coupled feature for the roll system of the strip mill: $M=\{(m_1(H_j), m_2(H_j), \ldots, m_n(H_j)\}$, $j=1, 2, \ldots, k$;

(d) calculating a confidence interval [$Bel_i$, $Pl_i$] for each feature evidence body for each fault type in a multi-dimensional coupled identification framework (also referred to as a recognition model framework) for the roll system of the strip mill based on a basic confidence assignment function $m_1(H_j)$;

(e) a set of torque feature: $H_j$ (j=1, 2, ..., 8), where $H_w$ denotes a target type. With the above method, the present disclosure may obtain the confidence of the coupling vibration type in the multi-dimensional coupled identification framework θ as well as the uncertainty of the evidence body of the multi-dimensional coupled identification framework, i.e., an uncertainty parameter $m_j(\theta)$.

In some embodiments, the classification and identification results of the multi-dimensional coupling features for the roll system of the strip mill are obtained according to a diagnostic classification decision rule, which is described as follows:

1) when $m(H_w)=\max\{(m(H_j)\}$, the strip mill has maximum confidence in the type of target coupled vibration that needs to be detected;
2) when $m(H_w)-m(H_j)>0.3$, a confidence difference between the target coupled vibration type and a non-target coupled vibration type of the strip mill is required to be greater than 0.3;
3) when $m(H_w)-m(\theta)>0.5$, the confidence difference between the confidence of the target coupled vibration type of the strip mill and an uncertainty confidence value of the evidence is required to be greater than 0.5; and 4) when $m(\theta)<0.4$, the uncertainty confidence value of the strip mill evidence must be less than 0.4.

The present disclosure provides the method for constructing the multi-dimensional coupled vibration identification model for the roll system of the strip mill by fusing the rolling force, acceleration, pressure and servo valve current signals from a strip mill pressing system. The method can simply and effectively recognize the operational characteristics of the strip mill in the rolling production process, which is of great significance for improving the control accuracy of the strip mill.

Figure 4:
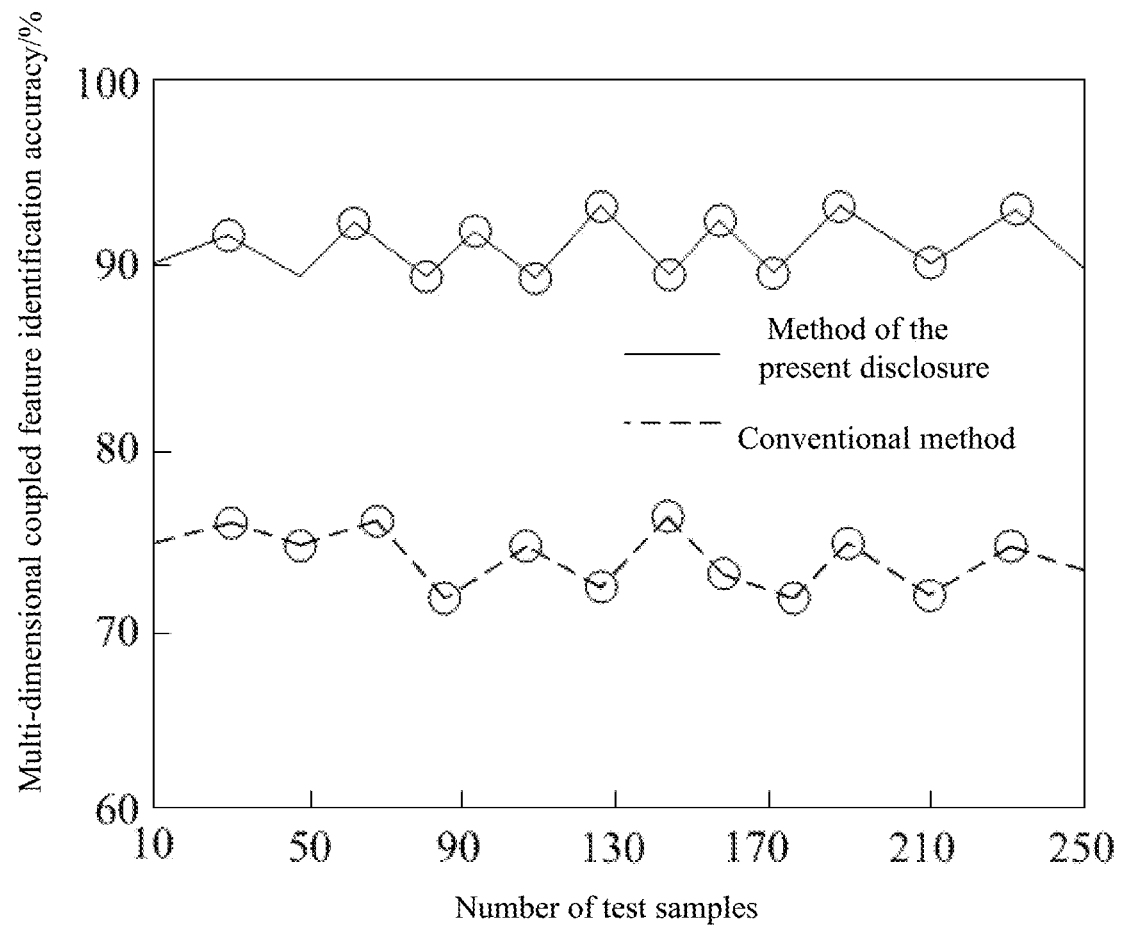
FIG. 4 is a schematic diagram illustrating a comparison of accuracy between an identification process provided in the present disclosure and a conventional identification process.

As shown in FIG. 4, compared with the conventional method, the multi-dimensional coupled identification accuracy of the multi-dimensional coupled vibration identification model for the roll system of the strip mill, which is constructed by the method of the present disclosure, is about 90%, which is much higher than the identification accuracy of the model constructed by the conventional method. Therefore, the multi-dimensional coupled vibration identification model for the roll system of the strip mill constructed by the method of the present disclosure has a high identification accuracy, and can accurately and efficiently make effective determination and prediction of the operation state of the strip mill.

The present disclosure adopts multi-sensor technology to monitor and capture the multi-dimensional data of the operation for the roll system of the strip mill in real time, and utilizes a wavelet hard threshold denoising manner for the preprocessing of the multi-dimensional data for the roll system of the strip mill, and then utilizes a wavelet packet energy analysis manner to extract and analyze the multi-dimensional data, so as to construct the multi-dimensional coupled vibration feature recognition model of the roll system of the strip mill based on SVM-DS using a multi-source heterogeneous information fusion manner based on the SVM and DS evidence fusion theory, thereby ensuring that the strip mill is stable and operates in an optimal working conditions.

Technical effects that may be realized by the technical solutions provided in accordance to some embodiments of the present disclosure may include, but are not limited to the following contents:

(1) The present disclosure is simple and easy to understand, easy to implement, and capture the equipment operation characteristics of the strip mill during the rolling process based on the multi-sensing technology through real-time monitoring, and contains more vibration information, so as to accurately reveal the nature of the vibration of the strip mill, and achieve efficient and accurate identification of the multi-dimensional coupling vibration characteristics for the roll system of the strip mill.

(2) The operation state of the strip mill is reflected from different levels and different degrees, which improves the information perception dimension and depth of the multi-dimensional coupling features of the strip mill, and improves the system coupling feature resolution and fault tolerance.

(3) The implementation of the scheme documented in accordance to some embodiments of the present disclosure provides some guidance for the multi-dimensional information perception and operation and maintenance of other large-scale electromechanical and hydraulic equipment.

Figure 5:
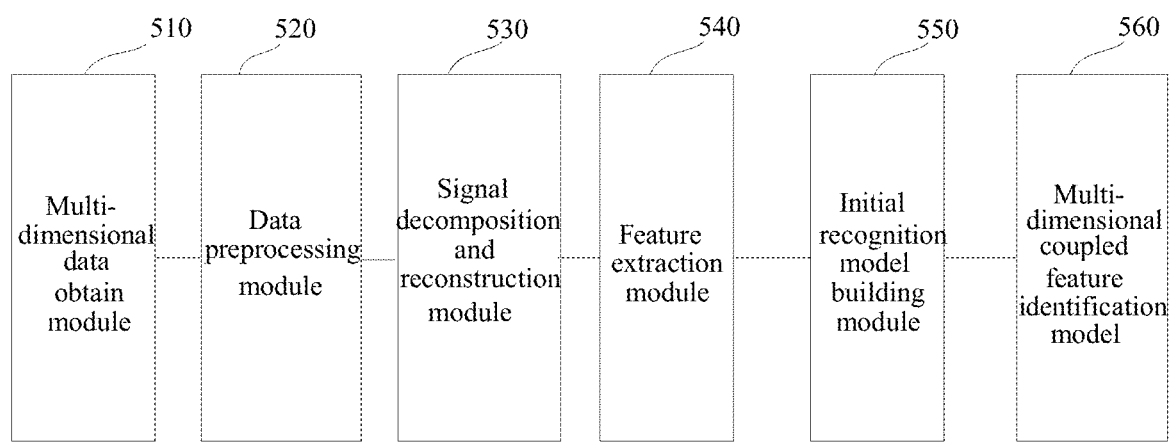
FIG. 5 is a schematic diagram illustrating a device for constructing a multi-dimensional coupled vibration identification model for a roll system of a strip mill according to the present disclosure.

Based on the same thought, the present disclosure further provides a device for constructing a multi-dimensional coupled vibration identification model for a roll system of a strip mill, as shown in FIG. 5. The device may comprise:

a multi-dimensional data obtain module 510 configured to obtain multi-dimensional data for the roll system of the strip mill during operation; wherein the multi-dimensional data is monitored through technical monitoring by multiple sensors;

a data preprocessing module 520 configured to obtain preprocessed data by preprocessing the multi-dimensional data;

a signal decomposition and reconstruction module 530 configured to obtain reconstructed data by decomposing and reconstructing the preprocessed data;

a feature extraction module 540 configured to obtain a feature vector by extracting a feature from the reconstructed data using a wavelet packet energy manner;

an initial recognition model building module 550 configured to obtain, based on using a Gaussian radial basis function as a kernel function of Support Vector Machine (SVM) model, an initial multi-dimensional coupled vibration feature local identification model for the roll system of the strip mill based on SVM;

a multi-dimensional coupled feature identification model construction model 560 for the roll system of the strip mill configured to train, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill.

Based on the device in FIG. 5, some embodiments may also be included. In some embodiments, the multi-dimensional coupled feature identification model construction model 560 for the roll system of the strip mill construction module may include:

an identification framework construction unit configured to construct an identification framework for multi-dimensional coupling for the roll system of the strip mill;

a multi-dimensional coupled vibration parameter space determination unit configured to determine a multi-dimensional coupled vibration parameter space for the roll system of the strip mill, collect data for the roll system of the strip mill using multiple types of sensors and extract feature parameters for categorization, and construct a multi-dimensional coupled parameter space from a plurality of feature sub-spaces;

a confidence assignment function set determining unit configured to identify, using the initial multi-dimensional coupled vibration feature local identification model for the roll system of the strip mill, for each of feature sub-spaces in the multi-dimensional coupled parameter space, the plurality of feature sub-spaces, and determine a basic confidence assignment function set of a multi-dimensional coupled feature for the roll system of the strip mill;

a confidence interval determining unit configured to calculate a confidence interval corresponding to each fault type in a recognition model framework for each feature space evidence body based on a basic confidence assignment function for each feature space evidence body in the basic confidence assignment function set;

a multi-dimensional coupled feature identification model construction unit for the roll system of the strip mill configured to construct the multi-dimensional coupled feature identification model for the roll system of the strip mill based on the confidence interval corresponding to each fault type in the recognition model framework for each feature space evidence body, and an uncertainty parameter of an overall recognition model;

In some embodiments, the data preprocessing module 520 may include:

a denoising unit configured to denoise the collected multi-dimensional data for the roll system of the strip mill using a wavelet hard-domain value denoising manner to obtain the first basic data; more descriptions regarding denoising may be found in the related descriptions of FIG. 1;

a singular value signal culling unit configured to cull a singular value signal from the first basic data according to a pauta criterion to obtain the second basic data; more descriptions regarding culling the singular value signal may be found in the related descriptions of FIG. 1;

a missing value interpolation unit configured to interpolate the second basic data with missing values using an interpolation function manner to obtain the preprocessed data; more descriptions regarding missing values interpolation may be found in the related descriptions of FIG. 1;

In some embodiments, the device may further include:

a classification unit configured to build a predetermined number of classifiers to diagnose a multi-dimensional coupled vibration type of the strip mill according to a multi-classification rule of the SVM; wherein the multi-dimensional coupled vibration type of the strip mill includes machine-liquid coupling, machine-electrical coupling, electrical-liquid coupling, machine-electrical-liquid coupling, vertical-torsional coupling, vertical-horizontal coupling, torsional-horizontal coupling, and vertical-horizontal-torsional coupling.

The embodiments of the present disclosure may be divided into functional modules according to the above embodiments of the method. For example, individual functional modules may be divided corresponding to individual functions, or two or more functions may be integrated in a single processing module. The above integrated modules can be implemented either in the form of hardware or in the form of software function modules. It should be noted that the division of the modules in the embodiments of the present disclosure is schematic and is only a logical functional division, and there can be another way of division in actual implementation.

While the present disclosure is described herein in connection with various embodiments, however, in the course of implementing the present disclosure for which protection is claimed, a person skilled in the art may understand and realize other variations of the disclosed embodiments by looking at the accompanying drawings, the disclosure, and the appended claims. In the claims, the word "comprising" does not exclude other components or steps, "a" or "one" does not exclude a plurality. A single processor or other unit may perform several of the functions enumerated in the claims. The fact that certain measures are documented in mutually distinct dependent claims does not mean that these measures cannot be combined to good effect.

While the present disclosure is described in connection with specific features and embodiments thereof, it is evident that various modifications and combinations thereof may be made without departing from the spirit and scope of the present disclosure. Correspondingly, the present disclosure and the accompanying drawings are merely exemplary illustrations of the present disclosure as defined by the appended claims, and are deemed to have covered any and all modifications, variations, combinations, or equivalents within the scope of the present disclosure. Obviously, those skilled in the art can make various changes and variations to the present disclosure without departing from the spirit and scope of the present disclosure. In this way, to the extent that these modifications and variations of the present disclosure fall within the scope of the claims of the present disclosure and their technical equivalents, the present disclosure is intended to include such modifications and variations.

What is claimed is:

1. A method for constructing a multi-dimensional coupled vibration identification model for a roll system of a strip mill, comprising:

obtaining multi-dimensional data for the roll system of the strip mill during operation; wherein the multi-dimensional data is monitored through technical monitoring by multiple sensors; the multi-dimensional data includes a three-axis acceleration signal of a bearing seat, a torque signal of a drive shaft, a rolling force signal, a current signal of a servo valve, and a pressure signal of large-small cavities of a press-down cylinder;

obtaining preprocessed data by preprocessing the multi-dimensional data;

obtaining reconstructed data by decomposing and reconstructing the preprocessed data;

obtaining a feature vector by extracting a feature from the reconstructed data using a wavelet packet energy manner;

obtaining, based on using a Gaussian radial basis function as a kernel function of Support Vector Machine (SVM) model, an initial multi-dimensional coupled vibration feature local identification model for the roll system of the strip mill based on SVM;

training, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill;

wherein the training, based on the feature vector, the initial multi-dimensional coupled vibration feature local identification model for the roll system of the strip mill using the multi-source heterogeneous information fusion manner to obtain the multi-dimensional coupled feature identification model for the roll system of the strip mill includes:

constructing an identification framework for multi-dimensional coupling for the roll system of the strip mill;

determining a multi-dimensional coupled vibration parameter space for the roll system of the strip mill, collecting data for the roll system of the strip mill using multiple types of sensors and extracting feature parameters for categorization, and constructing a multi-dimensional coupled parameter space from a plurality of feature sub-spaces;

identifying, using the initial multi-dimensional coupled vibration feature local identification model for the roll system of the strip mill, for each of the feature sub-spaces in the multi-dimensional coupled parameter space, the plurality of feature sub-spaces, and determining a basic confidence assignment function set of a multi-dimensional coupled feature for the roll system of the strip mill;

calculating a confidence interval corresponding to each fault type in a recognition model framework for each feature space evidence body based on a basic confidence assignment function for each feature space evidence body in the basic confidence assignment function set;

constructing the multi-dimensional coupled feature identification model for the roll system of the strip mill based on the confidence interval corresponding to each fault type in the recognition model framework for each feature space evidence body, and an uncertainty parameter of an overall recognition model;

the obtaining the feature vector by extracting the feature from the reconstructed data using the wavelet packet energy manner includes:

denoting a frequency band distribution energy of the multi-dimensional data collected by a system after reconstruction at an i-th layer and j-th node of a wavelet packet by $M_{ij}$ (j=0, 1, 2, ..., $2^i$−1), and using a formula:

$$M_{ij} = \sum_{k=1}^{n} |d_{j,k}|^2$$

to extract the multi-dimensional coupled feature for the roll system of the strip mill; wherein $d_{j,k}$ (j=0, 1, 2, ..., $2^i$−1, k=1, 2, ..., n) denotes wavelet packet decomposition node coefficients, and $M_{ij}$ denotes the multi-dimensional coupled feature for the roll system of the strip mill;

using a formula:

$$M = \sum_{j=0}^{2^i-1} M_{ij}$$

to determine a sum of energy M in each frequency band after reconstruction of the multi-dimensional signal for the roll system of the strip mill;

wherein the feature vector M of the multi-dimensional coupled feature signal energy distribution for the roll system of the strip mill extracted after reconstruction by wavelet packet decomposition is denoted as:

$$\overline{M} = \left[ \frac{M_{i0}}{M}, \frac{M_{i1}}{M}, \frac{M_{i2}}{M}, \dots, \frac{M_{i(2^i-2)}}{M}, \frac{M_{i(2^i-1)}}{M} \right]$$

normalizing the feature vector M of the multi-dimensional coupled feature signal energy distribution for the roll system of the strip mill by a median normalization manner:

$$Y' = \frac{Y - Y_{mid}}{Y_{max} - Y_{min}}$$

obtaining a multi-dimensional coupled feature wavelet packet energy proportion feature vector $\overline{M}_n$ after wavelet three-layer decomposition reconstruction:

$$\overline{M}_n = \left[ \frac{M_0}{M}, \frac{M_1}{M}, \frac{M_2}{M}, \frac{M_3}{M}, \frac{M_4}{M}, \frac{M_5}{M}, \frac{M_6}{M}, \frac{M_7}{M} \right] (n = 1, 2, \dots 8);$$

the obtaining, based on the Gaussian radial basis function as a kernel function of Support Vector Machine (SVM) model, the initial multi-dimensional coupled vibration feature local identification model for the roll system of the strip mill based on SVM further includes:

denoting the SVM-based the initial multi-dimensional coupled vibration feature local identification model for the roll system of the strip mill as:

$$f(y, \alpha) = \text{sgn}\left\{ \sum_{i=1}^{s} \alpha_i \exp\left[ -\frac{|y - y_i|^2}{\sigma^2} \right] - b \right\};$$

wherein σ denotes the Gaussian radial basis kernel function, b denotes a classification threshold, $a_i$ being determined automatically according to the system, S denotes a coupling factor, and $y_i$ denotes an i-th set of multi-dimensional operational data collected by the system;

before the training, based on the feature vector, the initial multi-dimensional coupled vibration feature local identification model for the roll system of the strip mill using the multi-source heterogeneous information fusion manner, further comprising:

building a predetermined number of classifiers to diagnose a multi-dimensional coupled vibration type of the strip mill according to a multi-classification rule of the SVM; wherein the multi-dimensional coupled vibration type of the strip mill includes machine-liquid coupling, machine-electrical coupling, electrical-liquid coupling, machine-electrical-liquid coupling, vertical-torsional coupling, vertical-horizontal coupling, torsional-horizontal coupling, and vertical-horizontal-torsional coupling.

2. The method for constructing the multi-dimensional coupled vibration identification model for the roll system of the strip mill according to claim 1, wherein the obtaining the preprocessed data by preprocessing the multi-dimensional data further includes:

denoising the collected the multi-dimensional data for the roll system of the strip mill using a wavelet hard-domain value denoising manner to obtain first basic data;

culling of a singular value signal from the first basic data according to a pauta criterion to obtain second basic data; and interpolating the second basic data with missing values using an interpolation function manner to obtain the preprocessed data.

3. The method for constructing the multi-dimensional coupled vibration identification model for the roll system of the strip mill according to claim 1, wherein the obtaining reconstructed data by decomposing and reconstructing the preprocessed data further includes:

performing signal decomposition and reconstruction on the preprocessed data using a wavelet packet decomposition algorithm:

$$\begin{cases} q_0^1(t) = y(t) \\ q_n^{2m-1}(t) = \sum_i H(i - 2t) q_{n-1}^m(t) \\ q_n^{2m}(t) = \sum_i G(i - 2t) q_{n-1}^m(t) \\ q_n^m(t) = 2\left[ \sum_i H(i - 2t) q_{n+1}^{2m-1}(t) + \sum_i G(i - 2t) q_{n+1}^{2m}(t) \right] \end{cases}$$

wherein y(t) is a time signal, t denotes a time, $q_n^m(t)$ is a m-th wavelet packet coefficient on a n-th layer decomposition, i denotes a i-th layer of a wavelet packet, G is a crossover filter related to a scale function, and H is a crossover filter related to a wavelet function.

4. The method for constructing the multi-dimensional coupled vibration identification model for the roll system of the strip mill according to claim 2, wherein the denoising the collected the multi-dimensional data for the roll system of the strip mill using a wavelet hard-domain value denoising manner to obtain first basic data further includes:

based on a formula:

$$\overline{\omega}_{j,k} = \begin{cases} \omega_{j,k} \omega_{j,k} \geq \lambda \\ 0 \omega_{j,k} < \lambda \end{cases}$$

denoising the collected multi-dimensional data for the roll system of the strip mill; wherein $\overline{\omega}_{j,k}$ is an original wavelet coefficient of a strip mill system, $\omega_{j,k}$ is a wavelet coefficients of the strip mill system after hard-domain value processing, $\lambda$ is a multi-dimensional coupling characteristic setting threshold of the under pressure system, j=1, 2, . . . , n denotes a number of layers of wavelet decomposition, and k=1, 2 denotes an order of wavelet decomposition coefficients.

5. The method for constructing the multi-dimensional coupled vibration identification model for the roll system of the strip mill according to claim 4, wherein the culling of a singular value signal from the first basic data according to a pauta criterion to obtain second basic data further includes:

using the pauta criterion:

$y_i - \overline{y} > 3\sigma_y$ culling of singular value signal for the first basic data; wherein $\overline{y}$ is a mean value of multi-dimensional operational data captured by the system, $$\overline{y} = \frac{\sum_{i=1}^{n} y_i}{n};$$

$\sigma_y$ is a mean square deviation of the multi-dimensional operational data captured by the system, $$\sigma_y = \sqrt{\frac{1}{n-1} \sum_{i=1}^{n} (y_i - \overline{y})^2}.$$

6. The method for constructing the multi-dimensional coupled vibration identification model for the roll system of the strip mill according to claim 5, wherein the interpolating the second basic data with missing values using an interpolation function manner to obtain the preprocessed data further includes:

using interpolating polynomials:

$f(y) = f(y_1) + (y - y_1)f[y_2, y_1] + (y - y_1)(y - y_2)f[y_3, y_2, y_1] +$ $(y - y_1)(y - y_2)(y - y_3)f[y_4, y_3, y_2, y_1] + \ldots +$ $(y - y_1)(y - y_2) \ldots (y - y_{n-1})f[y_n, y_{n-1}, \ldots y_3, y_2, y_1] ++$ $(y - y_1)(y - y_2) \ldots (y - y_n)f[y_n, y_{n-1}, \ldots y_3, y_2, y_1, y]$ interpolating missing values to the second basic data to obtain the preprocessed data; wherein f(y) denotes is a value to be interpolated, and $y_n$ denotes is a n-th set of the multi-dimensional operational data in the second basic data.

7. A device for constructing a multi-dimensional coupled vibration identification model for a roll system of a strip mill, comprising:

a multi-dimensional data obtain module configured to obtaining multi-dimensional data for the roll system of the strip mill during operation; wherein the multi-dimensional data is monitored through technical monitoring by multiple sensors; the multi-dimensional data includes a three-axis acceleration signal of a bearing seat, a torque signal of a drive shaft, a rolling force signal, a current signal of a servo valve, and a pressure signal of large-small cavities of a press-down cylinder;

a data preprocessing module configured to obtaining preprocessed data by preprocessing the multi-dimensional data;

a signal decomposition and reconstruction module configured to obtaining reconstructed data by decomposing and reconstructing the preprocessed data;

a feature extraction module configured to obtaining a feature vector by extracting a feature from the reconstructed data using a wavelet packet energy manner;

an initial recognition model building module configured to obtaining, based on a Gaussian radial basis function as a kernel function of Support Vector Machine (SVM) model, an initial multi-dimensional coupled vibration feature local identification model for the roll system of the strip mill based on SVM;

a multi-dimensional coupled feature identification model for the roll system of the strip mill construction module configured to training, based on the feature vector, the initial multi-dimensional coupled vibration feature local identification model for the roll system of the strip mill using a multi-source heterogeneous information fusion manner to obtain the multi-dimensional coupled feature identification model for the roll system of the strip mill;

the multi-dimensional coupled feature identification model for the roll system of the strip mill construction module includes:

an identification framework construction unit configured to constructing an identification framework for multi-dimensional coupling for the roll system of the strip mill;

a multi-dimensional coupled vibration parameter space determination unit configured to determining a multi-dimensional coupled vibration parameter space for the roll system of the strip mill, collecting data for the roll system of the strip mill using multiple types of sensors and extracting feature parameters for categorization, and constructing a multi-dimensional coupled parameter space from a plurality of feature sub-spaces;

a confidence assignment functions determining unit configured to identifying, using the initial multi-dimensional coupled vibration feature local identification model for the roll system of the strip mill, for each of the feature sub-spaces in the multi-dimensional coupled parameter space, the plurality of feature sub-spaces, and determining a basic confidence assignment function set of a multi-dimensional coupled feature for the roll system of the strip mill;

a confidence interval determining unit configured to calculating a confidence interval corresponding to each fault type in a recognition model framework for each feature space evidence body based on a basic confidence assignment function for each feature space evidence body in the basic confidence assignment function set;

a multi-dimensional coupled feature identification model for the roll system of the strip mill construction unit configured to constructing the multi-dimensional coupled feature identification model for the roll system of the strip mill based on the confidence interval corresponding to each fault type in the recognition model framework for each feature space evidence body, and an uncertainty parameter of an overall recognition model;

the feature extraction module further configured to:

denoting a frequency band distribution energy of the multi-dimensional data collected by a system after reconstruction at an i-th layer and j-th node of a wavelet packet by $M_{ij}$(j=0, 1, 2, ..., $2^i-1$), and using a formula:

$$M_{ij} = \sum_{k=1}^{n} |d_{j,k}|^2$$

to extract the multi-dimensional coupled feature for the roll system of the strip mill; wherein $d_{j,k}$ (j=0, 1, 2, ..., $2^i-1$, k=1, 2, ..., n) denotes wavelet packet decomposition node coefficients, and $M_{ij}$ denotes the multi-dimensional coupled feature for the roll system of the strip mill;

using a formula:

$$M = \sum_{j=0}^{2^i-1} M_{ij}$$

to determine a sum of energy M in each frequency band after reconstruction of the multi-dimensional signal for the roll system of the strip mill;

wherein the feature vector M of the multi-dimensional coupled feature signal energy distribution for the roll system of the strip mill extracted after reconstruction by wavelet packet decomposition is denoted as:

$$\overline{M} = \left[\frac{M_{i0}}{M}, \frac{M_{i1}}{M}, \frac{M_{i2}}{M}, \ldots, \frac{M_{i(2^i-2)}}{M}, \frac{M_{i(2^i-1)}}{M}\right]$$

normalizing the feature vector $\overline{M}$ of the multi-dimensional coupled feature signal energy distribution for the roll system of the strip mill by a median normalization manner:

$$Y' = \frac{Y - Y_{mid}}{Y_{max} - Y_{min}}$$

obtaining a multi-dimensional coupled feature wavelet packet energy proportion feature vector $\overline{M}_n$ after wavelet three-layer decomposition reconstruction:

$$\overline{M}_n = \left[\frac{M_0}{M}, \frac{M_1}{M}, \frac{M_2}{M}, \frac{M_3}{M}, \frac{M_4}{M}, \frac{M_5}{M}, \frac{M_6}{M}, \frac{M_7}{M}\right] (n = 1, 2, \ldots 8);$$

the obtaining, based on the Gaussian radial basis function as a kernel function of Support Vector Machine (SVM) model, the initial multi-dimensional coupled vibration feature local identification model for the roll system of the strip mill based on SVM further includes:

denoting the SVM-based the initial multi-dimensional coupled vibration feature local identification model for the roll system of the strip mill as:

$$f(y, \alpha) = \text{sgn}\left\{\sum_{i=1}^{s} \alpha_i \exp\left[-\frac{|y - y_i|^2}{\sigma^2}\right] - b\right\};$$

wherein σ denotes the Gaussian radial basis kernel function, b denotes a classification threshold, $a_i$ being determined automatically according to the system, S denotes a coupling factor, and $y_i$ denotes an i-th set of multi-dimensional operational data collected by the system;

the device further includes:

a classification unit configured to building a predetermined number of classifiers to diagnose a multi-dimensional coupled vibration type of the strip mill according to a multi-classification rule of the SVM; wherein the multi-dimensional coupled vibration type of the strip mill includes machine-liquid coupling, machine-electrical coupling, electrical-liquid coupling, machine-electrical-liquid coupling, vertical-torsional coupling, vertical-horizontal coupling, torsional-horizontal coupling, and vertical-horizontal-torsional coupling.

\* \* \* \* \*